US011277590B2

(12) United States Patent
Nallaperumal

(10) Patent No.: US 11,277,590 B2
(45) Date of Patent: Mar. 15, 2022

(54) METHOD AND A SYSTEM FOR PRESERVING INTRUSION EVENT/S CAPTURED BY CAMERA/S

(71) Applicant: Carrier Corporation, Palm Beach Gardens, FL (US)

(72) Inventor: Pirammanayagam Nallaperumal, Telangana (IN)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 17/113,990

(22) Filed: Dec. 7, 2020

(65) Prior Publication Data
US 2021/0185278 A1 Jun. 17, 2021

(30) Foreign Application Priority Data
Dec. 11, 2019 (IN) .............................. 201911051256

(51) Int. Cl.
  *H04N 7/18* (2006.01)
  *G08B 13/22* (2006.01)
  *H04N 5/232* (2006.01)
  *H04N 5/76* (2006.01)

(52) U.S. Cl.
  CPC ............ *H04N 7/181* (2013.01); *G08B 13/22* (2013.01); *H04N 5/23245* (2013.01); *H04N 5/76* (2013.01)

(58) Field of Classification Search
None
See application file for complete search history.

(56) References Cited

U.S. PATENT DOCUMENTS

| 2014/0101748 | A1* | 4/2014 | Ancona | G06F 21/575 726/12 |
| 2020/0285206 | A1* | 9/2020 | Young | G08B 19/00 |

FOREIGN PATENT DOCUMENTS

| WO | 2009138721 A2 | 11/2009 |
| WO | 2014110527 A1 | 7/2014 |

OTHER PUBLICATIONS

European Search Report application EP 20212267.7, dated May 3, 2021, 9 pages.

* cited by examiner

*Primary Examiner* — Eileen M Adams
(74) *Attorney, Agent, or Firm* — Cantor Colburn LLP

(57) ABSTRACT

A system and a method for preserving intrusion event/s captured by camera/s. A method includes determining a first event and switching a camera from a first mode to a second mode based on the first event. The method further includes detecting a second event and capturing the second event based on the detection. The method also includes transmitting a copy of the captured second event to one or more devices.

14 Claims, 4 Drawing Sheets

METHOD AND A SYSTEM FOR PRESERVING INTRUSION EVENT/S CAPTURED BY CAMERA/S

FOREIGN PRIORITY

This application claims priority to Indian Patent Application No. 201911051256, filed Dec. 11, 2019, and all the benefits accruing therefrom under 35 U.S.C. § 119, the contents of which in its entirety are herein incorporated by reference.

TECHNICAL FIELD

The present invention generally relates to video surveillance systems. More particularly, the invention relates to a system and a method for preserving intrusion event/s captured by the video surveillance systems.

BACKGROUND

For monitoring and surveillance purpose, cameras are installed at various places such as home, banks, offices, malls, colleges, hospitals and/or roads for monitoring and surveillance purpose. Such cameras capture images/videos of several activities (such as movement of people, traffic etc.) going on at various places. Further, the cameras are connected wirelessly or through wires with router/s so that they can transmit captured images/videos to a system where a personnel may be watching the captured images/videos.

However, an intruder or a burglar can disconnect or destroy the routers resulting in disconnection of the cameras with the router/s. This would prevent the cameras from transmitting the captured images/videos to a system. Moreover, the intruder can also damage the cameras to erase or destroy the captured images/videos of any activity of the intruder stored inside the cameras. Thus, it would be difficult for an authority or any person to track and identify such an intruder. Existing solutions provide a solution by transmitting an alarm signal to a person in case of disconnection of the cameras with the router. Also, other existing solutions use multiple channels to communicate between the router and the camera or involve an additional cost by requiring to store the captured images/videos in separate storage harddisks which requires manual intervention.

In view of the afore-mentioned problems in the existing solutions, there is a need of an efficient and effective system and a method for preventing erasal of images/videos of any suspicious activity of an intruder. There is also a need to provide a cost-effective solution for an automatic prevention of images/videos capturing the suspicious activity of an intruder without manual intervention. In order to solve the problems in the existing solutions, a system and a method are disclosed.

SUMMARY

Various embodiments of the invention describe a system for preserving intrusion event/s captured by video surveillance system/s. The system comprises a determination unit adapted to determine a first event. The system also comprises a camera adapted to switch from a first mode to a second mode based on the first event. Further, the camera comprises a detection unit adapted to detect a second event and a recording unit adapted to capture the second event based on the detection by the detection unit. A communication unit of the camera is adapted to transmit a copy of the captured second event to one or more devices. The one or more devices are adapted to receive the copy of the captured second event from the camera.

In an embodiment of the invention, the camera is connected to a router through a cellular network or a WiFi network in the first mode.

In a different embodiment of the invention, the camera is disconnected from a router in the second mode.

In an embodiment of the invention, the first event corresponds to the disconnection of the camera with the router.

In another embodiment of the invention, the camera detects the second event when the camera receives a signal from one or more sensors.

In yet another embodiment of the invention, the second event corresponds to an intrusion event by an intruder.

In another embodiment of the invention, the camera, the one or more devices and the one or more sensors are installed inside a premises. Also, the camera and the one or more devices are connected via a cellular connection or a WiFi connection.

In still another embodiment of the invention, the one or more devices corresponds to a user device, a smoke detector or a fire detector.

In a different embodiment of the invention, the one or more devices transmit the copy of the captured second event to a cloud.

Various embodiments of the invention describe a method for preserving intrusion event/s captured by video surveillance system/s. The method comprises steps of determining a first event and switching a camera from a first mode to a second mode based on the first event. The method further comprises steps of detecting a second event and capturing the second event based on the detection and transmitting a copy of the captured second event to one or more devices.

In an embodiment of the invention, the camera is connected to a router through a cellular network or a WiFi network in the first mode.

In a different embodiment of the invention, the camera is disconnected from a router in the second mode.

In an embodiment of the invention, the first event corresponds to the disconnection of the camera with the router.

In another embodiment of the invention, the camera detects the second event when the camera receives a signal from one or more sensors.

In yet another embodiment of the invention, the second event corresponds to an intrusion event by an intruder.

In another embodiment of the invention, the camera, the one or more devices and the one or more sensors are installed inside a premises.

In still another embodiment of the invention, the one or more devices corresponds to a user device, a smoke detector or a fire detector.

In a different embodiment of the invention, the one or more devices transmit the copy of the captured second event to a cloud.

In another different embodiment of the invention, a computer readable medium is disclosed for preserving intrusion event/s captured by video surveillance system/s. The computer readable medium comprises one or more processors and a memory is coupled to the one or more processors, the memory stores instructions executed by the one or more processors. The one or more processors are configured to determine a first event and switch a camera from a first mode to a second mode based on the first event. The one or more processors are further configured to detect a second event and capturing the second event based on the detection and transmit a copy of the captured second event to one or more devices.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION

Figure 1A:
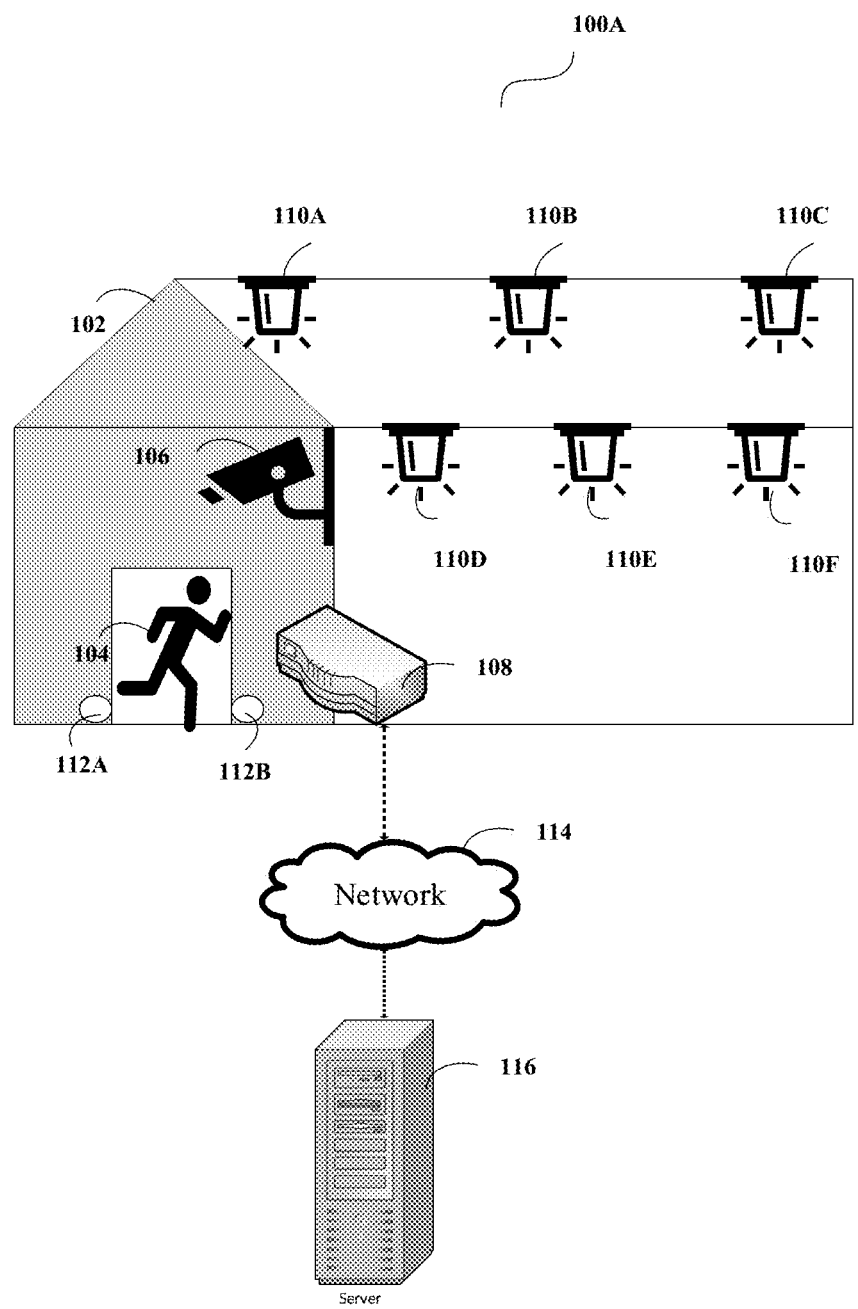
FIG. 1A depicts an exemplary system architecture with a camera operating in a first mode according to an exemplary embodiment of the invention.

Described herein is the technology with a system and a method for preserving intrusion event/s captured by video surveillance system/s. A camera may be installed at a premises and may operate in two modes i.e. a first mode and a second mode. In the first mode, the camera may be connected to a router and may operate normally by detecting and capturing second event/s (i.e. intrusion event/s) conducted by any intruder inside the premises. Also, the camera may transmit the captured second event/s to a server or a cloud through a network.

When a first event is determined, the camera may switch from the first mode to the second mode. In particular, the first event may correspond to a disconnection of the camera with the router. In the second mode, the camera may detect and capture the second event/s (i.e. intrusion event/s) conducted by the intruder inside the premises. Then, the camera may transmit a copy of the captured second event/s to one or more devices instead of the server or the cloud as the camera is disconnected with the router.

As used herein, the camera may determine the first event and/or the second event. The camera may comprise, but is not limited to, a communication unit, a recording unit, a detection unit, a battery, a memory and/or a processor. Such a camera may be a closed-circuit television (CCTV) camera, a smart camera or any such camera that is understood by a person skilled in the art.

As used herein, the premises may be a room, building, home, banks, offices, malls, colleges, hospitals, roads and/or or any such premises where the camera can be installed. Further, the router and/or the one or more detectors may also be located or positioned in the premises near the camera.

As used herein, the one or more devices may be connected with the camera through a network. The one or more devices may or may not be located or positioned in the premises near the camera. The one or more devices may be user devices, smoke detectors, fire detectors, smart lights, smart fans, smart geysers or any such smart device. Example of the user devices include a desktop, workstation PC, a laptop, a smart phone, a tablet, a wearable device and the like.

As used herein, the server has processing capabilities as disclosed further in the specification. The server may be a cloud storage, a remote database, or any such storage known in the art.

As used herein, the network may refer to a wired network, a cellular network (such as Global System for Mobile (GSM) network, a Long-Term Evolution (LTE) network, a code-division multiple access (CDMA) network, a narrow-band internet of thing (NB-IoT) technique or category M1 technique)), a WiFi network, a ZigBee network or any such network/technique that is known in the art.

Throughout the specification, reference numeral 110 depicts one or more devices. The reference numerals 110A, 110B, 110C . . . 110F each may be considered as a single device. Likewise, throughout the specification, reference numeral 112 depicts one or more sensors. The reference numerals 112A and 112B each may be considered as a single sensor.

FIG. 1A depicts an exemplary system architecture 100A with a camera 106 operating in a first mode according to an exemplary embodiment of the invention. As depicted in FIG. 1A, the camera 106 may be installed inside a premises 102 and is operating in a first mode. In this first mode, the camera 106 may be connected with a router 108. The router 108 may also be installed or positioned in the premises 102. Also, the camera 106 and the router 108 may be connected through a wired network, a cellular network or a WiFi network. In an exemplary embodiment, when an intruder 104 enters the premises 102, the camera 106 may itself detect presence of the intruder 104 in the premises 102 by analyzing real-time feed of the camera 106. In another exemplary embodiment, when the intruder 104 enters the premises 102, one or more sensors 112 installed/positioned in the premises 102 may sense presence of the intruder 104 in the premises 102. Then, the one or more sensors 112 may transmit a signal to the camera 106 for informing the camera 106 regarding the presence of the intruder 104 in the premises 102. Also, the intruder 104 may perform or do an intruder activity/event (i.e. second event) such as destruction inside the premises 102, stealing objects placed in the premises 102 or any such activity. Moreover, the camera 106 and the one or more sensors 112 may be connected through a network such as a wired network, a cellular network or a WiFi network. As used herein, the one or more sensors 112 may be ultrasonic sensors, thermal sensors, microwave detectors, pyroelectric human presence sensors, infra-red sensors or any such sensor that can detect presence and/or movement of the intruder 104 in the premises 102.

On detecting presence of the intruder 104 in the premises 102, the camera 106 may detect the second event (i.e. the intruder activity/event). For this, the camera 106 may analyze activities of the intruder 104 in the real-time feed of the camera 106. Based on the analysis of the activities of the intruder 104, the camera 106 may decide if the activities of the intruder 104 in the real-time feed of the camera 106 are dangerous or harmful. For an instance, if the intruder 104 in the real-time feed is or trying to break a lock of the premises 102, damaging the premises 102, destroying objects present in the premises 102, stealing objects present in the premises 102 and/or performing any such activity, then the camera 106 may detect/classify/consider such activities as the second event. Alternatively, if the activities of the intruder 104 in the real-time feed is not dangerous or harmful, then the camera 106 may not detect/classify/consider such activities as the second event. For detecting second event/s, the camera 106 may employ or use artificial intelligence technique or machine learning techniques.

When the camera 106 detects/classifies/considers such activities as the second event, the camera 106 may capture or record the second event. Then, the camera 106 may use a router 108 placed/installed in the premises 102 to transmit a copy of the captured second event to a server 116 through a network 114. In an alternative embodiment, the camera 106 may record the second event without detecting/classifying/considering such activities as the second event and may continuously transmit a copy of the captured second event to the server 116. An owner of the premises 102, security personnel of the premises 102 or any other authorized person may access the captured second event from the server 116. Such captured second event may be used as an evidence and may also help in tracking as well as identifying the intruder 104.

Figure 1B:
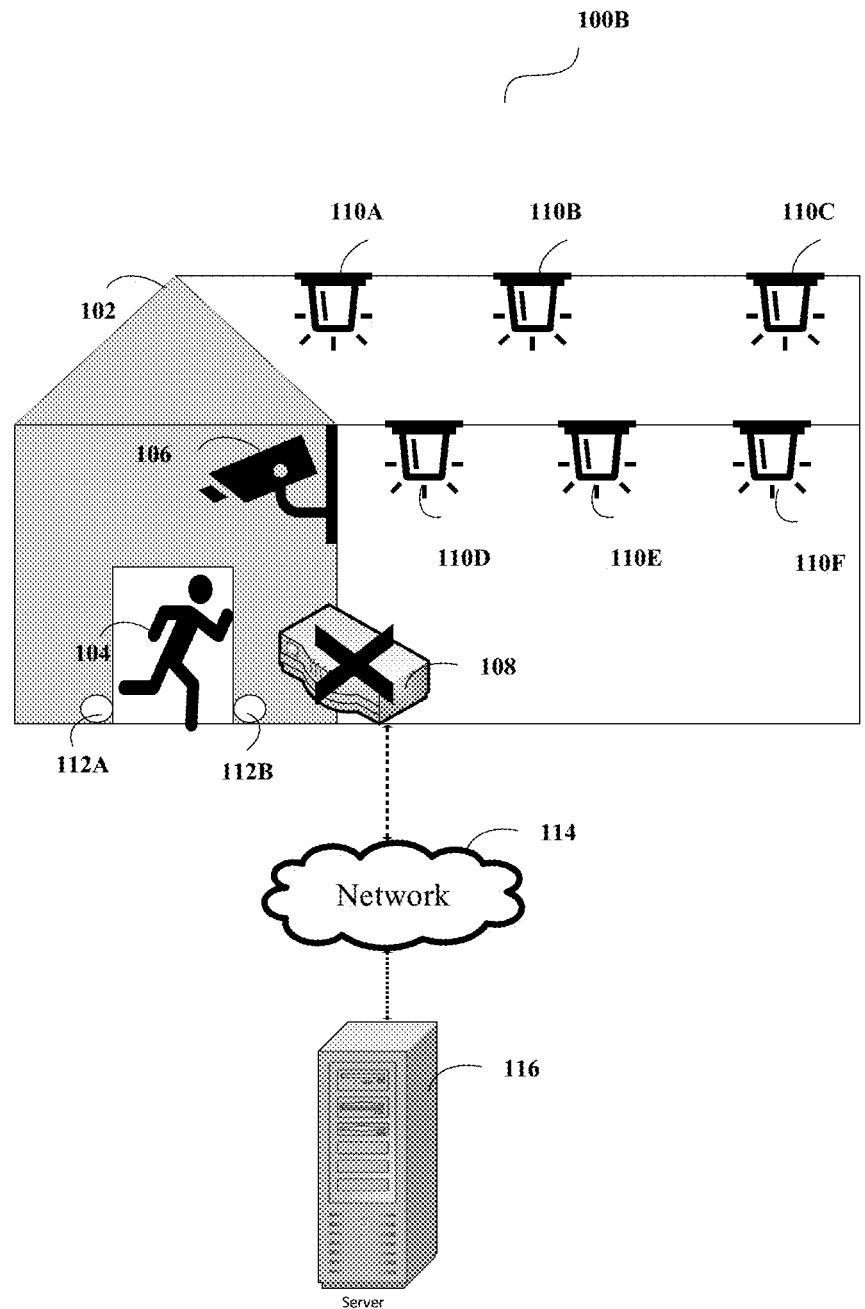
FIG. 1B depicts an exemplary system architecture with a camera operating in a second mode according to an exemplary embodiment of the invention.

FIG. 1B depicts an exemplary system architecture 100B with a camera 106 operating in a second mode according to an exemplary embodiment of the invention. When a first event is determined, the camera 106 may switch from a first mode to a second mode. The first event may be determined when the camera 106 gets disconnected from a router 108. Moreover, the first event may be determined by a determination unit. Such a determination unit 214 may reside inside the camera 106 or may reside outside the camera 106 and may be communicably coupled with the camera 106. In an exemplary embodiment, the camera 106 gets disconnected with the router 108 when an intruder 104 turns-off the router 108. In another exemplary embodiment, the camera 106 gets disconnected with the router 108 when the intruder 104 destroys/damages the router 108. In a different exemplary embodiment, the camera 106 gets disconnected from the router 108 when the intruder 104 switches-off a power button of the router 108. This embodiment of the present invention provides a technical advantage of automatically detecting the first event and providing information to the camera 106 to switch from first mode to the second mode.

In an exemplary embodiment, when the intruder 104 enters the premises 102, the camera 106 may itself detect presence of the intruder 104 in the premises 102 by analyzing real-time feed of the camera 106. In another exemplary embodiment, when the camera 106 is in the second mode, the camera 106 may receive a signal from one or more sensors 112 through a network such as a wired network, or a wireless network such as a cellular network or a WiFi network when the intruder 104 enters the premises 102. On detecting the presence of the intruder 104 in the premises 102, the camera 106 may detect the second event (i.e. the intruder activity/event) as explained above in FIG. 1A. When the camera 106 detects/classifies/considers activities of the intruder 104 as the second event (i.e. the intrusion event), the camera 106 may capture or record the second event. Also, the camera 106 may establish a cellular connection using a cellular network or a WiFi connection using a Wi-Fi network with one or more devices 110 installed in the premises 102. Then, the camera 106 may create a copy of the captured second event and may transmit the copy of the captured second event to the one or more devices 110 installed in the premises 102 through the cellular connection or the WiFi connection. In an exemplary embodiment, the camera 106 may identify one or more devices 110 installed within a pre-defined distance (say, 5 meters) of the premises 102 for transmitting the copy of the captured second event. In another exemplary embodiment, the camera 106 may identify one or more devices 110 which are already pre-configured in the camera 106 by an owner of the premises 102, a security personnel of the premises 102 or by any other person to transmit the copy of the captured second event.

By transmitting the copy of the captured second event to the one or more devices 110, a back-up of the captured second event may be created and such back-up can be used as an evidence even when the intruder 104 has damaged the camera 106. Also, by creating a back-up of the captured second event, the evidence capturing the intruder's activity may be preserved. This embodiment of the present invention provides a technical advantage of fail-safe mechanism by saving multiple copies of the captured second event in several devices 110.

When the copy of the captured second event is transmitted, the one or more devices 110 may receive the copy of the captured second event and may also store the copy of the captured second event in a memory of the one or more devices 110. In an exemplary embodiment, the owner of the premises 102, the security personnel of the premises 102 or any other person may retrieve the copy of the captured second event from the memory of the one or more devices 110. In another exemplary embodiment, the one or more devices 110 may transmit the copy of the captured second event to a server/cloud 116 using a network. And, the owner of the premises 102, the security personnel of the premises 102 or any other person may retrieve the copy of the captured second event from the server/cloud 116 using a network. In a different exemplary embodiment, the one or more devices 110 may be a user device (or a mobile device) of the owner of the premises 102, or of the security personnel of the premises 102 or of any other person that receives the copy of the captured second event and may also store the copy of the captured second event in its memory. This embodiment of the present invention provides a technical advantage of providing users a copy of the captured second event stored in multiple devices 110.

Figure 2:
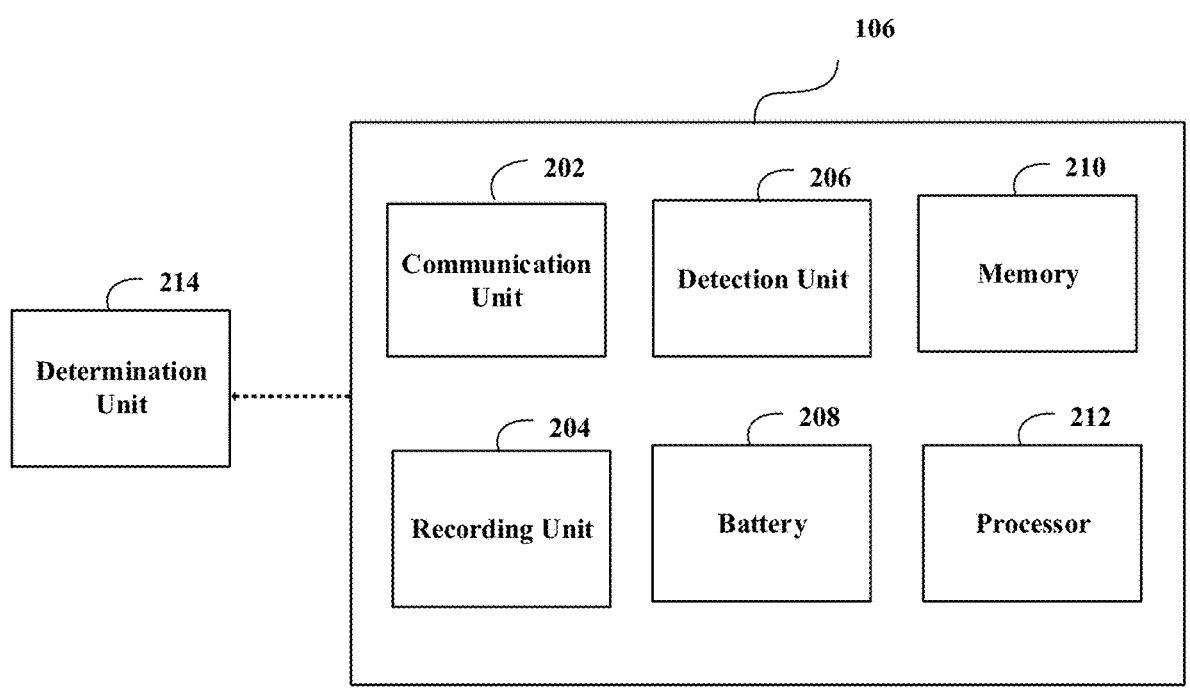
FIG. 2 depicts block diagram of different components of an exemplary camera according to an exemplary embodiment of the invention.

FIG. 2 depicts a block diagram of different components of a camera 106 according to an exemplary embodiment of the invention. The camera 106 may comprise of, but is not limited to, a communication unit 202, a recording unit 204, a detection unit 206, a battery 208, a memory 210 and/or a processor 210. Also shown is a determination unit 214 associated with the camera 106. In an exemplary embodiment, the camera 106 may comprise the determination unit 214. In another exemplary embodiment, the camera 106 may be communicably coupled with the determination unit 214. The determination unit 214 may be adapted to determine a first event, wherein the first event corresponds to a disconnection of the camera 106 with a router 108 as explained above. When the determination unit 214 detects the first event, the determination unit 214 may also be adapted to communicate the first event to the camera 106. Accordingly, the camera 106 may be adapted to switch from a first mode to a second mode. The detection unit 206 may be adapted to detect a second event, wherein the second event corresponds to an intrusion event performed by an intruder 104 as explained above. When the detection unit 206 detect the second event, the detection unit 206 may also be adapted to communicate the second event to the recording unit 204. The recording unit 204 may be adapted to capture the second event and may create a copy of the captured second event. Then, the recording unit 204 may be adapted to communicate the copy of the captured second event to the communication unit 202. The communication unit 202 may be adapted to transmit the copy of the captured second event to one or more devices 110 through a network. In an exemplary embodiment, the communication unit 202 may be a transceiver. The battery 208 may be adapted to provide power to the camera 106 to perform operation/s as described herein. The memory 210 may be adapted to store the copy of the captured second event and identifiers of each the one or more devices 110 etc.

Moreover, the communication unit 202, the recording unit 204, the detection unit 206, the battery 208, the memory 210 and/or the determination unit 214 may be communicably coupled with the processor 212. The different units described herein are exemplary. The invention may be performed using one or more units. For example, the tasks executed by the communication unit 202, the recording unit 204, the detection unit 206, the battery 208, the memory 210, the determination unit 214 and/or the processor 212 may be performed by a single unit. Alternatively more number of units as described herein may be used to perform the present invention.

Figure 3:
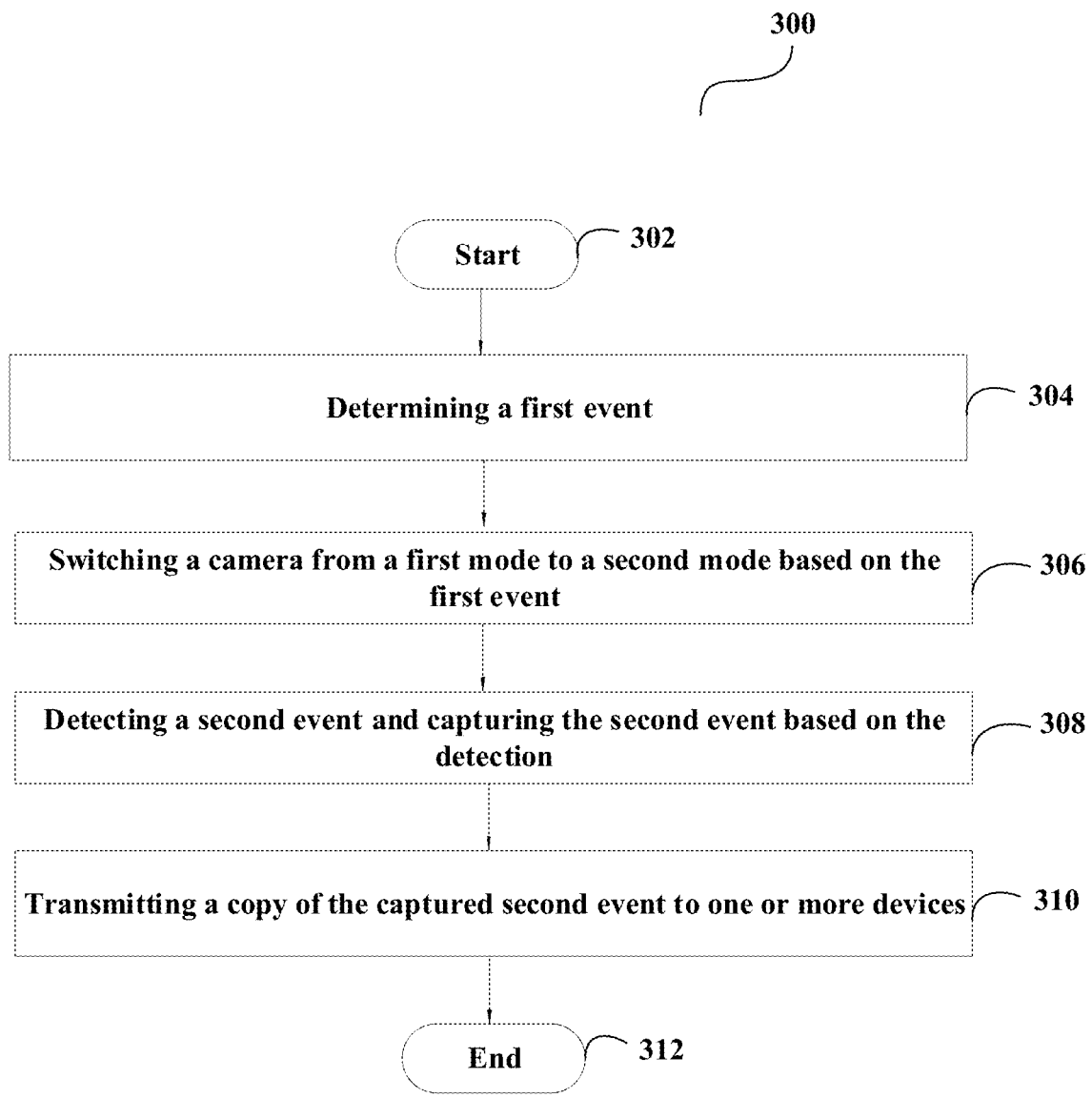
FIG. 3 depicts an exemplary flowchart illustrating a method to perform the invention according to an exemplary embodiment of the invention.

FIG. 3 depicts a flowchart outlining the features of the invention in an exemplary embodiment of the invention. The method flowchart 300 describes a method being for preserving intrusion event/s captured by video surveillance system/s. The method flowchart 300 starts at step 302.

At step 304, a determination unit 214 may determine a first event as explained above in FIG. 1B. The first event may corresponds to a disconnection of a camera 106 with a router 108.

At step 306, the camera 106 may switch from a first mode to a second mode based on the first event as explained above in FIG. 1A and FIG. 1B.

At step 308, the camera 106 may detect a second event as described above in FIG. 1A and FIG. 1B above. In an exemplary embodiment, the camera 106 may detect the second event. The second event may correspond to an intrusion event performed by an intruder 104. In an exemplary embodiment, when an intruder 104 enters a premises 102, the camera 106 may detect presence of the intruder 104 in the premises by analyzing real-time feed of the camera 106. In another exemplary embodiment, when the intruder 104 enters the premises 102, the camera 106 may receive signal from one or more sensors 112 for informing the camera 106 regarding the presence of the intruder 104 in the premises 102. Then, the camera 106 may capture the second event based on the detection of the second event and may create a copy of the captured second event.

At step 310, the camera 106 may transmit the copy of the captured second event to one or more devices 110 as explained in FIG. 1B above. Then, the method flowchart 300 may end at 312.

The present invention is applicable in various industries/fields such as, but not limited to, banking industry, hospitality industry, housing industry, building/construction industry, offices, universities, hospitals, colleges, homes and any such industry/field that is well known in the art and where the cameras are used for surveillance and monitoring purpose.

The embodiments of the invention discussed herein are exemplary and various modification and alterations to a person skilled in the art are within the scope of the invention.

In one embodiment of the invention, the invention can be operated using the one or more computer readable devices. The one or more computer readable devices can be associated with a camera 106. A computer readable medium comprises one or more processors and a memory coupled to the one or more processors, the memory stores instructions executed by the one or more processors. The one or more processors configured to determine a first event and switch by a camera 106 from a first mode to second mode based on the first event. The one or more processors configured to detect a second event and capturing the second event based on the detection. The one or more processors also configured to transmit a copy of the captured second event to one or more devices 110.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
   a camera adapted to operate in a first mode having a connection with a router;
   a determination unit adapted to determine disconnection of the camera with the router;
   the camera adapted to switch from the first mode to a second mode based on disconnection of the camera with the router, in the second mode the camera having a connection with one or more devices, the camera further comprising:
      a detection unit adapted to detect a second event when the camera is operating in the second mode, wherein the second event corresponds to an intrusion event by an intruder;
      a recording unit adapted to capture the second event based on the detection by the detection unit; and
      a communication unit adapted to transmit a copy of the captured second event to the one or more devices; and
   the one or more devices adapted to receive the copy of the captured second event from the camera.

2. The system of claim 1, wherein the camera is connected to the router through a cellular network or a WiFi network in the first mode.

3. The system of claim 1, wherein the camera detects the second event when the camera receives a signal from one or more sensors.

4. The system of claim 3, wherein the camera, the one or more devices and the one or more sensors are installed inside a premises.

5. The system of claim 1, wherein the camera and the one or more devices are connected via a cellular connection or a WiFi connection.

6. The system of claim 1, wherein the one or more devices corresponds to a user device, a smoke detector or a fire detector.

7. The system of claim 1, wherein the one or more devices transmit the copy of the captured second event to a cloud.

8. A method comprising:
   operating a camera in a first mode having a connection with a router;
   determining a disconnection of the camera with the router;
   switching a camera from the first mode to a second mode based disconnection of the camera with the router, in the second mode the camera having a connection with one or more devices;
   detecting a second event when the camera is operating in the second mode, wherein the second event corresponds to an intrusion event by an intruder;
   capturing the second event based on the detecting; and
   transmitting a copy of the captured second event to the one or more devices.

9. The method of claim 8, wherein the camera is connected to the router through a cellular network or a WiFi network in the first mode.

10. The method of claim 8, wherein the camera detects the second event when the camera receives a signal from one or more sensors.

11. The system of claim 10, wherein the camera, the one or more devices and the one or more sensors are installed inside a premises.

12. The method of claim 8, wherein the one or more devices corresponds to a user device, a smoke detector or a fire detector.

13. The method of claim 8, wherein the one or more devices transmit the copy of the captured second event to a cloud.

14. A computer readable medium comprising one or more processors and a memory coupled to the one or more processors, the memory storing instructions executed by the one or more processors, the one or more processors configured to execute operations comprising:
- operating a camera in a first mode having a connection with a router;
- determining disconnection of the camera with the router;
- switching the camera from the first mode to a second mode based on disconnection of the camera with the router, in the second mode the camera having a connection with one or more devices;
- detecting a second event when the camera is operating in the second mode, wherein the second event corresponds to an intrusion event by an intruder;
- capturing the second event based on the detecting; and
- transmitting a copy of the captured second event to the one or more devices.

* * * * *